US011535026B2

(12) United States Patent
De Gaillande et al.

(10) Patent No.: US 11,535,026 B2
(45) Date of Patent: Dec. 27, 2022

(54) HOLOGRAPHIC FOIL SUPPLYING DEVICE AS WELL AS HOT FOIL STAMPING MACHINE

(71) Applicant: BOBST MEX SA, Mex (CH)

(72) Inventors: Christophe De Gaillande, Les Monts-de-Corsier (CH); Christoph Vollmer, Vevey (CH); Simon Tran Ha, Bavois (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 17/287,091

(22) PCT Filed: Oct. 28, 2019

(86) PCT No.: PCT/EP2019/025368
§ 371 (c)(1),
(2) Date: Apr. 20, 2021

(87) PCT Pub. No.: WO2020/088796
PCT Pub. Date: May 7, 2020

(65) Prior Publication Data
US 2021/0379885 A1 Dec. 9, 2021

(30) Foreign Application Priority Data
Oct. 29, 2018 (EP) .................................. 18020560

(51) Int. Cl.
*B41F 16/00* (2006.01)
*B44C 1/14* (2006.01)
*G03H 1/02* (2006.01)

(52) U.S. Cl.
CPC ........ *B41F 16/0026* (2013.01); *B41F 16/006* (2013.01); *G03H 1/028* (2013.01); *B41P 2219/22* (2013.01)

(58) Field of Classification Search
None
See application file for complete search history.

(56) References Cited

U.S. PATENT DOCUMENTS

| 3,975,226 A * | 8/1976 | Boettcher ............... B41F 16/00 156/542 |
| 5,275,684 A | 1/1994 | Marazzi et al. |
| 2015/0075394 A1* | 3/2015 | Sun ...................... B65H 18/145 242/564.5 |

FOREIGN PATENT DOCUMENTS

| CN | 2605123 | 3/2004 |
| CN | 102555431 A | 7/2012 |

(Continued)

OTHER PUBLICATIONS

International Search Report and Written Opinion dated Dec. 6, 2019 in International Patent Application No. PCT/EP2019/025368 (8 pages, in English).

*Primary Examiner* — Leslie J Evanisko
(74) *Attorney, Agent, or Firm* — Bookoff McAndrews, PLLC (57) ABSTRACT

A holographic foil supplying device for a hot foil stamping machine has a reel (26) for holographic foil (20), an advancement system (24) for advancing the holographic foil (20) along a movement path (P) in a feeding direction (F) and a frame (22) supporting the reel (26) and the advancement system (24), wherein the frame (22) comprises a mount (30) for mounting the holographic foil supplying device (18) to the hot foil stamping machine.

Further, a hot foil stamping machine is shown.

20 Claims, 3 Drawing Sheets (56) References Cited

FOREIGN PATENT DOCUMENTS

| | | | | |
|---|---|---|---|---|
| CN | 104334352 | A | 2/2015 | |
| CN | 108136758 | A | 6/2018 | |
| CN | 108349238 | A | 7/2018 | |
| EP | 0757627 | A1 | 7/1998 | |
| EP | 1588968 | A1 | 10/2005 | |
| GB | 1187971 | A | 4/1970 | |
| GB | 2263086 | A | 7/1993 | |
| GB | 2344074 | A * | 5/2000 | ............ B41F 19/064 |
| JP | H0655726 | A | 3/1994 | |
| JP | 2007001761 | A | 7/2007 | |
| JP | 2007176174 | A | 7/2007 | |
| JP | 2009073015 | A * | 4/2009 | ............ B41F 19/062 |
| JP | 2015520043 | A | 7/2015 | |
| WO | 8704665 | A1 | 8/1987 | |
| WO | 9529813 | A1 | 11/1995 | |
| WO | 2006075053 | A1 | 7/2006 | |
| WO | 2013149703 | A1 | 10/2013 | |

\* cited by examiner

HOLOGRAPHIC FOIL SUPPLYING DEVICE AS WELL AS HOT FOIL STAMPING MACHINE

The invention relates to a holographic foil supplying device for a hot foil stamping machine and a hot foil stamping machine for applying a hologram onto a substrate.

Providing a substrate with holograms is a complicated process having strict requirements on the precision of the process.

The process is usually carried out in a hot foil stamping machine having a platen unit that is supplied with the substrate to be processed and a holographic foil comprising the holograms.

For a high quality result, the advancement of the holographic foil into the platen unit has to be controlled or calibrated precisely. Further, lateral displacement of the holographic foil with respect to the platen unit has to be compensated with suitable adjustment means.

Usually, hot foil stamping machines are provided with a variety of single rollers, sensors or adjustment means for the advancement and alignment of the holographic foil, but are difficult to assemble as the many rollers, sensors, control means and adjustment means have to be mounted individually to the hot foil stamping machine.

It is thus the object of the invention to provide a holographic foil supplying device as well as a hot foil stamping machine that is easier to assemble and to calibrate.

For this purpose, a holographic foil supplying device for a hot foil stamping machine is provided, comprising a reel for holographic foil, an advancement system for advancing the holographic foil along a movement path in a feeding direction and a frame supporting the reel as well as the advancement system, wherein the frame comprises a mount for mounting the supplying device to the hot foil stamping machine.

By having a frame that supports both the reel and the advancement system of the holographic foil supplying device, a single unit is provided that can be mounted and aligned on a hot foil stamping machine with little effort.

In particular, the mount may be the only connection of the holographic foil supplying device with the hot foil stamping machine that supports the holographic foil supplying device, i.e. which carries its weight.

Preferably, the advancement system comprises a feeding roller, a pressure roller and a motor for driving the feeding roller, wherein the feeding roller, the pressure roller and/or the motor are supported by the frame. This way, a fully functional advancement system can be provided on the frame.

For driving the feeding roller, the motor and the feeding roller may each comprise a pulley, wherein the pulleys are connected by a belt for torque transmission or any other suitable advancement system.

In order to achieve a compact device, the motor is located on a bottom side of the frame and the reel and/or the feeding roller is located at a top side of the frame.

In another embodiment of the invention, the advancement system comprises a control loop for controlling the advancement of the holographic foil, in particular the control loop being a closed control loop. This way, the precision of the advancement movement can be improved significantly. The advancement affects the position of the hologram(s) on the stamped substrate along the foil feeding direction.

For a reliable and agile control loop, the advancement system may comprise an alignment sensor for the holographic foil, the alignment sensor being supported by the frame.

The alignment sensor may be a camera directed to a sensor section of the movement path in order to achieve a high alignment precision.

In particular, the camera is configured to detect the position of holograms on the holographic foil.

The alignment sensor may be an optical cell, optionally connected to an optical fiber, directed to the sensor section of the movement path in order to achieve a high alignment precision.

In particular, the optical cell is configured to detect the position of an ad-hoc mark printed on the holographic foil.

In order to further improve the precision of the feeding movement, a support surface, in particular a plate, is provided in the sensor section for supporting the holographic foil.

The advancement system is configured to feed the holographic foil into the hot foil stamping machine using a stop-and-go cycle synchronized with the stamping cycles of the machine. In particular, when the stamping machine is in an open configuration, the foil is advanced until it reaches its predetermined position and stops, then the machine closes to stamp, opens again, and a new cycle starts.

The holographic foil comprises a repetition of holograms or groups of holograms. The advancement of the holographic foil may be adjusted by measuring, within the sensor section, the relative positions of a hologram (or the relative positions of an ad hoc mark) across stamping cycles, until the hologram reaches the correct position on the substrate.

In a variant of the invention, the supplying device comprises a first deflection roller and a second deflection roller, wherein the sensor section is located between the first deflection roller and the second deflection roller. The deflection rollers ensure that the holographic foil assume the indented position in the sensor section.

The second deflection roller may be an exit roller, i.e. the last roller in the movement path of the supplying device.

In a further embodiment of the invention, the frame comprises at least one side portion, in particular two side portions, each side portion being located at a different side of the movement path, wherein the reel, the pressure roller, the feeding roller, the two deflection rollers, the support surface and/or an exit roller extend from the at least one side portion to the other side, in particular to the other side portion and/or wherein the motor is located between the side portions. By the use of, preferably flat, side portions of the frame, the holographic foil supplying device has a very compact design.

The other side of the one side portion may be the other side of the movement path and/or the holographic foil with respect to the side portion.

For pretensioning the holographic foil, the holographic foil supplying device may comprise a brake coupled to the reel for braking a rotational movement of the reel, wherein the reel and the brake are arranged on opposite sides of one of the side portions.

The brake may be located on same side as the pulleys. Further, the brake and/or the pulleys may be provided at the outer side of a side portion.

In another embodiment of the invention, the mount comprises lateral adjustment means for adjusting the position of the frame in a direction perpendicular to the feeding direction. As the mount itself comprises the lateral adjustment means, the effort in aligning the device can further be reduced. This lateral adjustment affects the position of the hologram(s) on the stamped substrate along a perpendicular to the foil feeding direction.

For example, the mount comprises a base mountable to the hot foil stamping machine and a carriage slideably connected to the base, wherein the carriage supports the frame, and wherein the lateral adjustment means is configured to position the carriage with respect to the base. A reliable and precise lateral adjustment can be achieved this way.

The carriage may be slideable horizontally and perpendicularly to the feeding direction. For example, the adjustment means comprises a screw actuating the carriage.

For above mention purpose, further a hot foil stamping machine for applying a hologram to a substrate is provided, comprising a platen unit, a feeding unit for feeding the substrate to the platen unit in a substrate feeding direction and at least one holographic foil supplying device, in particular as described above, for feeding a holographic foil to the platen unit in a foil feeding direction, in particular the foil feeding direction being opposite to the substrate feeding direction. This allows the usage of multiple holographic foil supplying devices.

The substrate may be cardboard or paper or any other type of sheet from material.

For example, the hot foil stamping machine comprises at least one receiving reel for the substrate, wherein the at least one supplying device is located on the same side of the platen unit as the at least one receiving reel and/or the feeding unit is located on the opposite side of the platen unit than the holographic foil supplying device, leading to a compact design.

Further features and advantages will be apparent from the following descriptions as well as the attached drawings to which reference is made. In the drawings.

Figure 1:
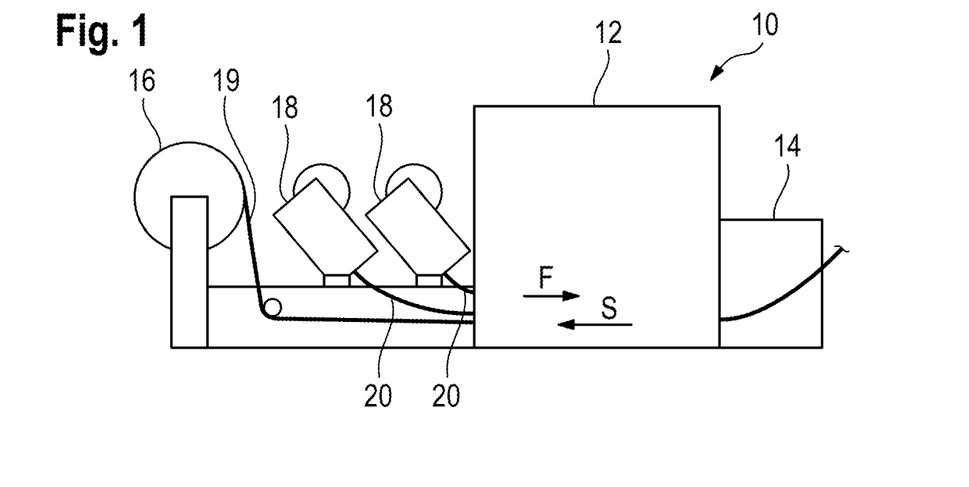
FIG. 1 shows a schematic view of a hot foil stamping machine according to the invention with holographic foil supplying devices according to the invention.

FIG. 1 shows a hot foil stamping machine 10 having a platen unit 12, a feeding unit 14, a receiving reel 16 and two holographic foil supplying devices 18.

The hot foil stamping machine 10 is, for example, used to apply holograms to substrates, for example cardboard or paper. The hot foil stamping machine 10 is for example used to manufacture high quality product packages or currency bills.

The platen unit 12 comprises a platen as per se known that is configured to apply a hologram to a substrate 19 from a holographic foil, i.e. a foil containing the holograms. The transfer of the holograms from the holographic foil to the substrate 19 is effected by pressure and heat.

The platen unit 12 has a first side, in FIG. 1 the right-hand side, on which the feeding unit 14 is located.

On the second side, the left-hand side in FIG. 1, the receiving reel 16 and the holographic foil supplying devices 18 are arranged. Thus, the holographic foil supplying devices 18 are located on the same side of the platen unit 12 as the receiving reel 16 but on the opposite side than the feeding unit 14.

The feeding unit 14 is per se known and is configured to supply the platen unit 12 with the substrate 19 to be processed. The feeding unit 14 feeds the substrate 19 to the platen unit 12 in a substrate feeding direction S.

On the other side, the receiving reel 16 is configured to receive the substrate 19 exiting the platen unit 12, i.e. the processed substrate 19 comprising the hologram.

The two holographic foil supplying devices 18 are configured to supply the platen unit 12 with a holographic foil 20 in a holographic foil feeding direction F.

FIGS. 2 to 5 show one of the holographic foil supplying devices 18 in more detail. For simplicity, the holographic foil supplying device 18 is called supplying device 18 in the following.

The supplying device 18 comprises a frame 22, an advancement system 24 and a reel 26 for the holographic foil 20.

The holographic foil 20 on the reel 26 comprises holograms to be applied to the substrate 19 in the platen unit 12.

The frame 22 comprises two side portions 28 and a mount 30 for mounting the frame 22 to the hot foil stamping machine 10, more precisely to a mounting point 32 of the hot foil stamping machine 10.

It is of course possible that the frame 22 comprises only one side portion 28. In this case, the arrangement is the same as explained below solely without the second side portion 28. Thus, elements described in the following as extending from one of the side portions 28 to the other side portion 28 extend, in the case of a single side portion 28, from the one side portion 28 to the other side, i.e. the other of the movement path P and/or the holographic foil 20 side with respect to the side portion 28.

The side of the frame 22 provided with the mount 30 is the bottom side 34 and the opposite side is called the top side 36 of the frame 22.

The side portions 28 are flat pieces of metal or a plastic material having holes, slots and openings for mounting various parts of the advancement system 24 and the reel 26.

The side portions 28 are generally identical and are arranged parallel but spaced apart to each other. The distance between the side portions 28 is smaller than 1.2 times the width of the holographic foil 20.

The reel 26 is located at the top side 36 and extends over the top side 36 of the frame 22.

The reel 26 is connected to a brake 37 on the outside of one of the side portions 28.

The brake 37 is rotatably fixed to the reel 26 through the side portion 28 and is able to create a resistance for a rotatable movement of the reel 26.

This is done in the shown embodiment with a gear wheel fixedly connected to the reel 26. The brake 37 interacts with the gear wheel to alter the speed of the reel 26.

The mount 30 comprises a base 38 and a carriage 40.

The base 38 is fixed to the hot foil stamping machine 10 at the mounting point 32.

The carriage 40 is mounted slideably in the base 38, wherein the frame 22 is fixed to the carriage 40. This way, the frame 22 is slideable with respect to the carriage 40 and the platen unit 12 as well.

The mount 30 is the only support of the supplying device 18 at the hot foil stamping machine 10 that carries its weight.

The advancement system 24 has a motor 46, an alignment sensor 48, four rollers 50, 52, 54 and 56 and a plate 58.

The rollers 50, 52, 54, 56 and the reel 26 are rotatably mounted in the frame 22 extending from one of the side portions 28 to the other, thus spanning the distance between the two side portions 28.

The motor 46 and the alignment sensor 48 are arranged between the side portions 28 and fixed thereto, wherein the motor 46 is located at the bottom side 34 in the shown embodiment.

The rollers 50, 52 are a pair of driving rollers being a feeding roller 50 and a pressure roller 52.

On the outer side of one of the side portions 28, i.e. not between the side portions 28, two pulleys 60 are provided, each corresponding to either one of the feeding roller 50 or the motor 46.

The pulley 60 of the feeding roller 50 is rotatably fixed to the feeding roller 50 through the side portion 28, e.g. by an axis.

The other pulley 60 is rotatably fixed to an output shaft of the motor 46 through the side portion 28.

The pulleys 60 are connected via a belt 62 so that torque created by the motor 46 can be transmitted to the feeding roller 50 via the pulleys 60 and the belt 62. Of course, the pulleys 60 may be driven by any other suitable advancement system as well.

The pressure roller 52 is not driven.

The brake 37, the pulleys 60 and the belt 62 are located on the same side of the frame 22, i.e. outside of the same side portion 28.

Figure 3:
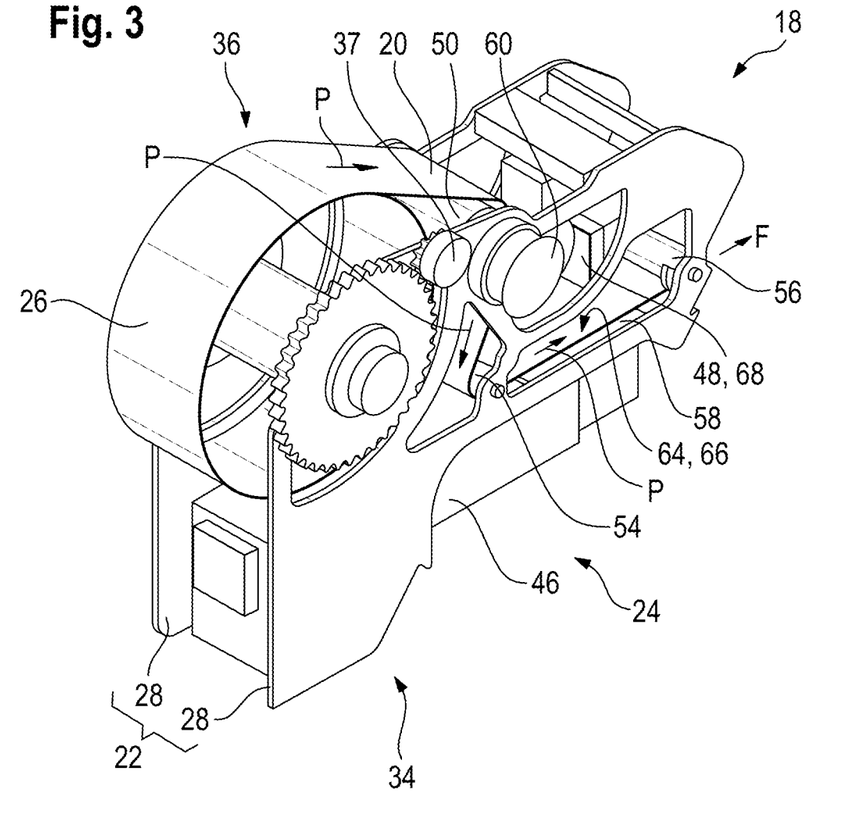
FIG. 3 shows the holographic foil supplying device of FIG. 2 in a perspective side view of a first side.

For the sake of simplicity, the belt 62 and the pulley 60 associated with the motor 46 have been omitted in FIG. 3.

The rollers 54 and 56 are deflection rollers 54, 56 and not driven.

The deflection rollers 54, 56 are arranged in a distance from one another, wherein the plate 58 is located between the deflection rollers 54, 56.

More precisely, the plate 58 comprises a support surface 64 being oriented in the direction of the deflection rollers 54, 56. The support surface 64 is aligned within a plane tangential to the deflection rollers 54, 56 in a side view.

The section between the deflection rollers 54, 56, more precisely the section above the support surface 64 defines a sensor section 66 for the alignment sensor 48.

In the sensor section 66, the holographic foil 20 is supported by the plate 58, more precisely the support surface 64.

The alignment sensor 48 comprises a camera 68 and in the shown embodiment a control unit 70.

The camera 68 is capable of detecting holograms on the holographic foil 20 and is directed to the sensor section 66.

The control unit 70 is electronically connected to the camera 68 and the motor 46 for controlling the function of the motor.

The control unit 70 comprises a closed control loop for controlling the movement of the motor based on the data received by the camera 68.

The rollers 50, 52, 54, 56 and the plate 58 define a movement path P of the holographic foil 20.

The movement path P starts at the reel 26 and runs between the feeding roller 50 and the pressure roller 52 to the deflection roller 54. The movement path P then passes the support surface 64 of the plate 58 and continues to the deflection roller 56. The deflection roller 56 can be regarded as an exit roller of the supplying device 18.

Figure 4:
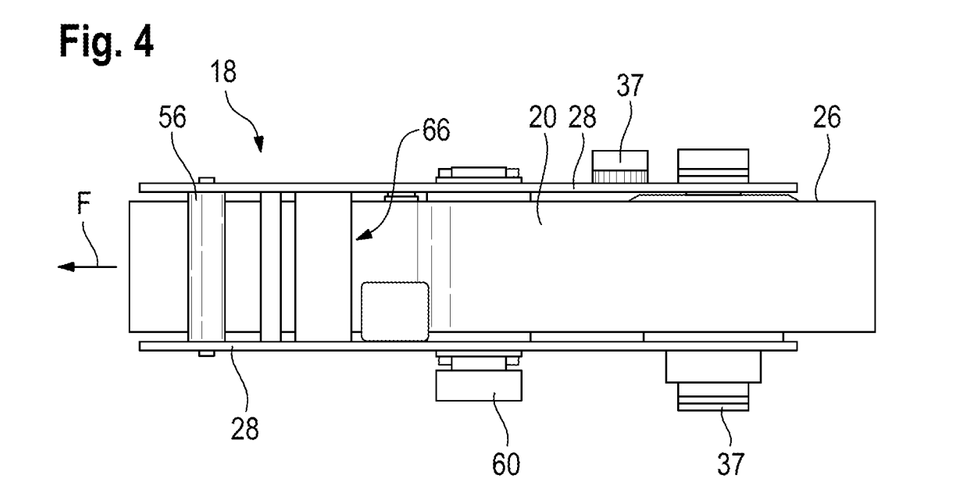
FIG. 4 shows a top view of the holographic foil supplying device according to FIG. 2.
Figure 5:
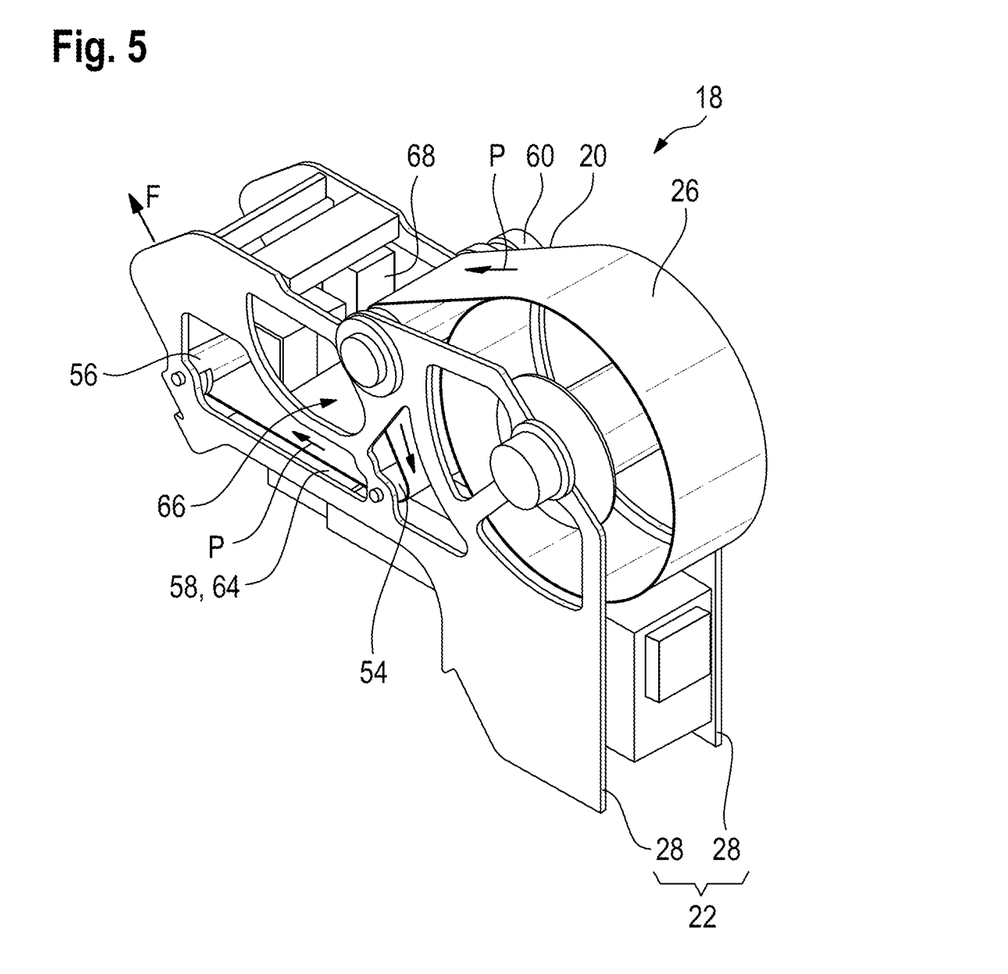
FIG. 5 shows a perspective view in a second side of the holographic foil supplying device according to FIG. 2.

Thus, the movement path P lies between the side portions 28 so that the side portions 28 are located at different sides of the movement path P seen in a top view (FIG. 4).

As seen in the side view (FIG. 2), the deflection rollers 54, 56 are located on the opposite side of the pathway P as the plate 58.

Figure 2:
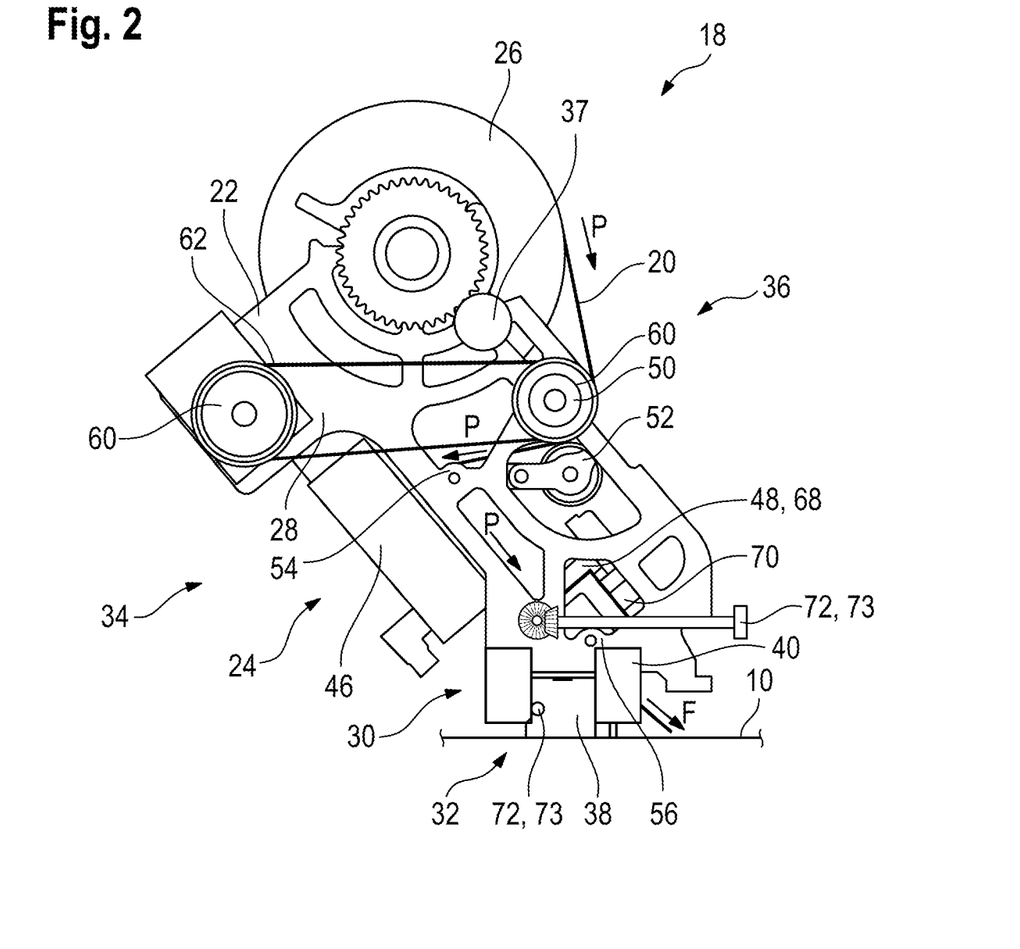
FIG. 2 shows an enlarged view of one of the holographic foil supplying devices of FIG. 1 in a side view.

During operation of the hot foil stamping machine 10 the supplying device 18 feeds the holographic foil 20 to the platen unit 12 by activating the motor 46. Accordingly, the feeding roller 50 is driven leading to a movement of the holographic foil 20 in the holographic foil feeding direction F along the movement path P. The advancement movement is adjusted or controlled via the alignment sensor 48 and the control unit 70.

The camera 68 detects the absolute location of a hologram on the holographic foil 20 in the sensor section 66, e.g. by comparing the location to the location of a marking on the support surface 64. According to the detected location of the hologram, the following advancement movement is adjusted in length, i.e. the motor 46 is actuated for a slightly shorter or longer period of time.

Lateral adjustment of the location of the holographic foil 20, i.e. adjustment in the plane of the holographic foil 20 but perpendicular to the holographic foil feeding direction F, is done manually using the mount 30 of the supplying device 18. The carriage 40 with the attached frame 22 that supports the reel 26, the rollers 50, 52, 54, 56, the motor 46 and the alignment sensor 48, can be moved perpendicularly to the feeding direction F with respect to the rest of the hot foil stamping machine 10, especially with respect to the platen unit 12. This is done by sliding the carriage 40 relative to the base 38 which is fixedly mounted on the mounting point 32 of the hot foil stamping machine 10. The movement can be performed by adjustment means 72, for example by a screw 73 of the mount 30 that engages the carriage 40.

Thus, the supplying device 18 is a compact device that can be mounted to the hot foil stamping machine 10 with a single mount 30 and provides means for adjustment in the lateral direction perpendicular to the feeding direction F and along the feeding direction F. Therefore, the supplying device 18 can be easily and quickly mounted to the hot foil stamping machine 10 and rapidly aligned with respect to the platen unit 12.

It is of course possible, that the control unit 70 is located outside of the supplying device 18 and connected electrically with the camera 68 and the motor 46 (possibly via a motor driver), however, as the electric connection is done via wires or wireless, this connection does not contribute to supporting the supplying device 18 at the hot foil stamping machine 10.

The invention claimed is:

1. A holographic foil supplying device for a hot foil stamping machine, comprising:
   a reel for holographic foil;
   an advancement system for advancing the holographic foil along a movement path in a feeding direction; and
   a frame supporting the reel and the advancement system, wherein the frame comprises a mount for mounting the holographic foil supplying device to the hot foil stamping machine,
   wherein the mount comprises a lateral adjustment means for adjusting a position of the frame in a direction perpendicular to the feeding direction, and
   wherein the mount comprises a base and a carriage, the base being mountable to the hot foil stamping machine and the carriage being slideably connected to the base, the carriage supports the frame, and the lateral adjustment means is configured to position the carriage with respect to the base.

2. The holographic foil supplying device according to claim 1, wherein the advancement system comprises a feeding roller, a pressure roller, and a motor, the motor driving the feeding roller, wherein the feeding roller, the pressure roller, and/or the motor are supported by the frame.

3. The holographic foil supplying device according to claim 2, wherein the motor and the feeding roller each comprise a pulley, wherein the pulley of the motor and the pulley of the feeding roller are connected by a belt for torque transmission or any other suitable advancement system.

4. The holographic foil supplying device according to claim 2, wherein the motor is located on a bottom side of the frame, and
the reel and/or the feeding roller is located at a top side of the frame.

5. The holographic foil supplying device according to claim 2, wherein the advancement system comprises a control loop for controlling the advancement of the holographic foil.

6. The holographic foil supplying device according to claim 5, wherein the advancement system includes an alignment sensor for the holographic foil, the alignment sensor being supported by the frame.

7. The holographic foil supplying device according to claim 6, wherein the alignment sensor is a camera directed to a sensor section of the movement path.

8. The holographic foil supplying device according to claim 7, further comprising a support surface in the sensor section for supporting the holographic foil.

9. The holographic foil supplying device according to claim 8, further comprising a first deflection roller and a second deflection roller, wherein the sensor section is located between the first deflection roller and the second deflection roller.

10. The holographic foil supplying device according to claim 9, wherein the frame comprises two side portions, each two side portions being located at a different side of the movement path,
the reel, the pressure roller, the feeding roller, the first deflection roller, the second deflection roller, the support surface, and/or an exit roller extend from a first one of the two side portions to a second one of the two side portions, and
the motor is located between the two side portions.

11. The holographic foil supplying device according to claim 10, further comprising a brake coupled to the reel for braking a rotational movement of the reel, wherein the reel and the brake are arranged on opposite sides of one of the two side portions.

12. The holographic foil supplying device according to claim 1, wherein the lateral adjustment means includes a screw.

13. The holographic foil supplying device according to claim 12, wherein the screw engages the carriage to position the carriage with respect to the base.

14. A hot foil stamping machine for applying a hologram to a substrate, the hot foil stamping machine comprising:
a platen unit,
a feeding unit for feeding the substrate to the platen unit in a substrate feeding direction; and
at least one holographic foil supplying device according to claim 1, the at least one holographic foil supplying device feeding the holographic foil to the platen unit in the feeding direction, the foil feeding direction being opposite to the substrate feeding direction.

15. The hot foil stamping machine according to claim 14, further comprising at least one receiving reel for the substrate, wherein the at least one holographic foil supplying device is located on a same side of the platen unit as the at least one receiving reel, and/or the feeding unit is located on an opposite side of the platen unit than the at least one holographic foil supplying device.

16. A holographic foil supplying device for a hot foil stamping machine, comprising:
a reel for holographic foil;
an advancement system for advancing the holographic foil along a movement path in a feeding direction, wherein the advancement system comprises a control loop for controlling the advancement of the holographic foil;
a frame supporting the reel and the advancement system, wherein the frame comprises a mount for mounting the holographic foil supplying device to the hot foil stamping machine, and wherein the frame comprises two side portions, each of the two side portions being located at a different side of the movement path;
a support surface for supporting the holographic foil; and
a first deflection roller and a second deflection roller,
wherein the advancement system includes an alignment sensor for the holographic foil, the alignment sensor being supported by the frame, wherein the alignment sensor is a camera directed to a sensor section of the movement path,
wherein the support surface is in the sensor section,
wherein the sensor section is located between the first deflection roller and the second deflection roller,
wherein the advancement system comprises a feeding roller, a pressure roller, and a motor, the motor driving the feeding roller, wherein the feeding roller, the pressure roller, and/or the motor are supported by the frame,
wherein the reel, the pressure roller, the feeding roller, the first deflection roller, the second deflection roller, the support surface, and/or an exit roller extend from a first one of the two side portions to a second one of the two side portions, and
wherein the motor is located between the two side portions.

17. A hot foil stamping machine for applying a hologram to a substrate, the hot foil stamping machine comprising:
a platen unit,
a feeding unit for feeding the substrate to the platen unit in a substrate feeding direction; and
at least one holographic foil supplying device according to claim 16, the at least one holographic foil supplying device feeding the holographic foil to the platen unit in the feeding direction, the foil feeding direction being opposite to the substrate feeding direction.

18. A holographic foil supplying device for a hot foil stamping machine, comprising:
a reel for holographic foil;
an advancement system for advancing the holographic foil along a movement path in a feeding direction; and
a frame supporting the reel and the advancement system, wherein the frame comprises a mount for mounting the holographic foil supplying device to the hot foil stamping machine,
wherein the mount comprises a screw for adjusting a position of the frame in a direction perpendicular to the feeding direction, and
wherein the mount comprises a base and a carriage, the base being mountable to the hot foil stamping machine and the carriage being slideably connected to the base, the carriage supports the frame, and the screw is configured to position the carriage with respect to the base.

19. The holographic foil supplying device according to claim 18, wherein the screw engages the carriage to position the carriage with respect to the base.

20. A hot foil stamping machine for applying a hologram to a substrate, the hot foil stamping machine comprising:
- a platen unit,
- a feeding unit for feeding the substrate to the platen unit in a substrate feeding direction; and
- at least one holographic foil supplying device according to claim 18, the at least one holographic foil supplying device feeding the holographic foil to the platen unit in the feeding direction, the foil feeding direction being opposite to the substrate feeding direction.

* * * * *

UNITED STATES PATENT AND TRADEMARK OFFICE
CERTIFICATE OF CORRECTION

| | |
|---|---|
| PATENT NO. | : 11,535,026 B2 |
| APPLICATION NO. | : 17/287091 |
| DATED | : December 27, 2022 |
| INVENTOR(S) | : Christophe De Gaillande et al. |

It is certified that error appears in the above-identified patent and that said Letters Patent is hereby corrected as shown below:

In the Specification

Column 1, Line 4, insert:
--CROSS-REFERENCE TO RELATED APPLICATION(S)
This application is a National Stage under 35 U.S.C. § 371 of International Application No. PCT/EP2019/025368, filed on October 28, 2019, which claims priority to European Patent Application No. 18020560.1, filed on October 29, 2018, the contents of all of which are incorporated by reference in their entirety.--

Signed and Sealed this
Third Day of September, 2024

*Katherine Kelly Vidal*

Katherine Kelly Vidal
*Director of the United States Patent and Trademark Office*